(12) United States Patent
Herzig et al.

(10) Patent No.: US 11,183,203 B2
(45) Date of Patent: Nov. 23, 2021

(54) NEURAL REPRESENTATION OF AUTOMATED CONVERSATIONAL AGENTS (CHATBOTS)

(71) Applicant: International Business Machines Corporation, Armonk, NY (US)

(72) Inventors: Jonathan Herzig, Tel Aviv (IL); David Konopnicki, Haifa (IL); Tommy Sandbank, Herzeliyya (IL); Michal Shmueli-Scheuer, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 16/384,996

(22) Filed: Apr. 16, 2019

(65) Prior Publication Data

US 2020/0335124 A1 Oct. 22, 2020

(51) Int. Cl.
*G10L 25/51* (2013.01)
*G06N 3/08* (2006.01)
*G06K 9/62* (2006.01)
*G06F 16/901* (2019.01)
*H04L 12/58* (2006.01)

(52) U.S. Cl.
CPC .......... *G10L 25/51* (2013.01); *G06F 16/9024* (2019.01); *G06K 9/6221* (2013.01); *G06N 3/08* (2013.01); *H04L 51/02* (2013.01)

(58) Field of Classification Search
CPC ............ G06F 16/9024; G06F 16/3329; G06K 9/6221; G06N 3/08; G10L 25/51; H04L 51/02
See application file for complete search history.

(56) References Cited

U.S. PATENT DOCUMENTS

| | | | |
|---|---|---|---|
| 9,794,199 B2 | 10/2017 | Capper et al. | |
| 9,912,810 B2 | 3/2018 | Segre et al. | |
| 10,699,708 B2* | 6/2020 | Lecue | G06F 16/9024 |
| 10,984,034 B1* | 4/2021 | Sandland | G06N 3/02 |
| 2018/0077181 A1* | 3/2018 | Chen | H04L 63/1425 |
| 2018/0082184 A1 | 3/2018 | Lifan et al. | |
| 2020/0065857 A1* | 2/2020 | Lagi | G06F 16/9535 |

OTHER PUBLICATIONS

Rui Yan, Chitty-Chitty-Chat Bot: Deep Learning for Conversational AI, yInstitute of Computer Science and Technology, Peking University, zBeijing Institute of Big Data Research, Beijing, China, Proceedings of the Twenty-Seventh International Joint Conference on Artificial Intelligence (IJCAI-18), pp. 5520-5526.

* cited by examiner

*Primary Examiner* — Angela A Armstrong
(74) *Attorney, Agent, or Firm* — Gregory J Kirsch

(57) ABSTRACT

Embodiments of the present systems and methods may provide techniques by which bots may be analyzed using improved representations of bot structure and a means of assessing conversational quality that may provide improved efficiency. For example a method may comprise training, at a computer system comprising a processor, memory accessible by the processor, and computer program instructions stored in the memory and executable by the processor, a neural network model to learn representations that capture characteristics of the graphs of chatbots, wherein the captured characteristics include at least a content-based representation based on user utterances that are relevant to the nodes and based on the chatbot response for the nodes.

17 Claims, 8 Drawing Sheets

Fig. 3

Agent: *Hi, I'm Eva a virtual assistant, how may I help you?*
Customer: *I'm having some issues with my headset.*
Agent: *Which model are you using?*
Customer: *A wireless one.*
Agent: *Please make sure that they are charged.*
Customer: *Yes they are, and they work well with other devices...*
Agent: *Got you. In this case go and try our echo test.*
Customer: *Well, I'll stop by one of your stores and see a technician.*
Agent: *I'm not trained on that yet, but I'm still learning. You may want to rephrase your question and try again.*
Customer: *What is your closest location?*
Agent: *Check here to see our locations in your city.*

---
Algorithm 1 Mapping node to section and bin. ⟵ 502 input $d$: graph depth
$w = [w_1, w_2, \ldots, w_d]$: graph width
$s$: number of sections
$b = [b_1, b_2, \ldots, b_s]$: number of bins per section
$l$: node depth
$n = [c_1, c_2, \ldots, c_l]$: node ($l \leq d$)
output $S$: section index
$B$: bin index 1: $S = \left\lfloor \dfrac{(l-1)}{d} \times s + 1 \right\rfloor$ 2: $B = \left\lfloor \dfrac{(c_l - 1)}{\omega_l} \times b_s + 1 \right\rfloor$ 3: return $S$, $B$
---

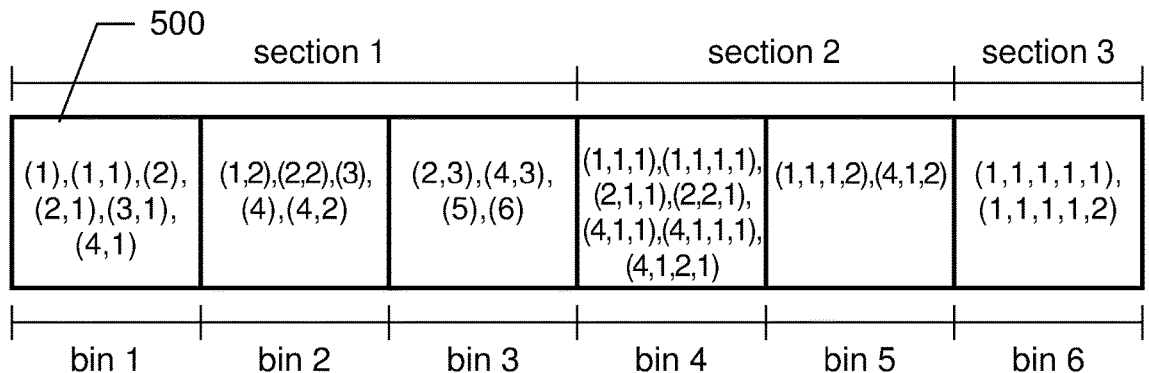

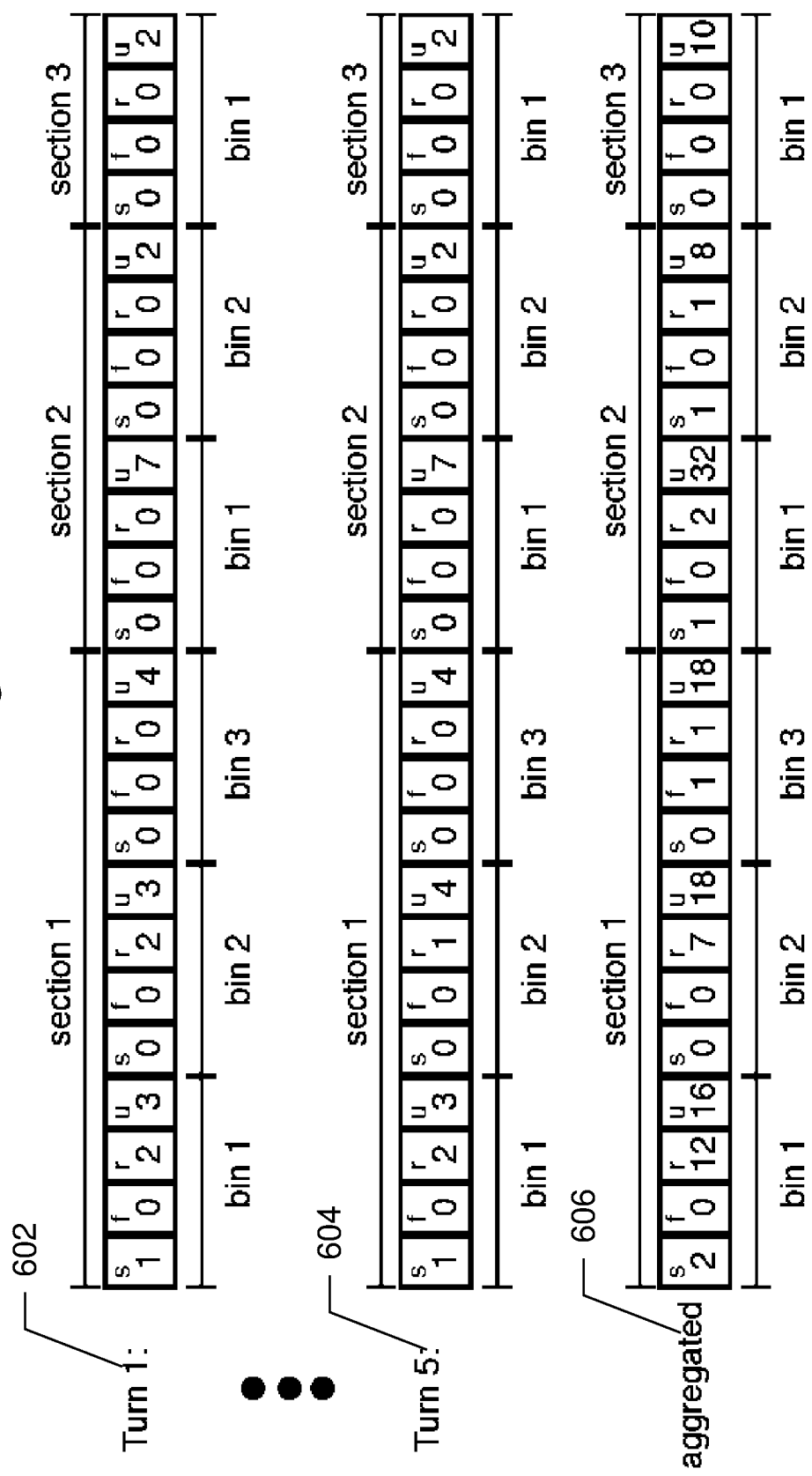

NEURAL REPRESENTATION OF AUTOMATED CONVERSATIONAL AGENTS (CHATBOTS)

BACKGROUND

The present invention relates to analyzing chatbots using improved representations of bot structure to assessing conversational quality of chatbots.

Automated conversational agents or chatbots (i.e., bots) are becoming widely used in multiple domains as a new way to interact with information and services through an automated dialog interface. Supporting this, many bot programming platforms are becoming available, each equipped with novel debuggers and testing tools aimed at improving the quality of individual chatbots. Beyond individual chatbots, bot platforms can also be improved and new services and tools can be introduced. Doing so requires an understanding of what sort of bots are being built (captured by their underlying conversation graphs) and how well they perform (derived through analysis of conversation logs). This, in turn, requires a suitably uniform representation of bot structure and an efficient means of assessing conversational quality.

Accordingly, a need arises for techniques by which bots may be analyzed using improved representations of bot structure and a means of assessing conversational quality that may provide improved efficiency.

SUMMARY

Embodiments of the present systems and methods may provide techniques by which bots may be analyzed using improved representations of bot structure and a means of assessing conversational quality that may provide improved efficiency. For example, embodiments of the present systems and methods may utilize new models that captures a compact representation of a bot (such as bot embeddings) based on the graph structure and usage logs of the bot. This representation may be used to improve the quality of bot analysis tasks, such as the detection of whether a bot is "real", that is, is actually being used to handle customer requests, as opposed, say, to merely being used to test the capabilities of the platform, and the detection of problematic conversations between a bot and a human user (which may be useful for focusing improvement efforts on a deployed bot).

For example, in an embodiment, a method may comprise training, at a computer system comprising a processor, memory accessible by the processor, and computer program instructions stored in the memory and executable by the processor, a neural network model to learn representations that capture characteristics of the graphs of chatbots, wherein the captured characteristics include at least a content-based representation based on user utterances that are relevant to the nodes and based on the chatbot response for the nodes, wherein each graph of a chatbot comprises a plurality of nodes, wherein each node comprises information indicating user utterances that are relevant to the node, wherein at least some of the nodes comprise information indicating a chatbot response for the node, and wherein at least some of the nodes have a positive path to another node that is taken when a user utterance is relevant to the node, and at least some of the nodes have a negative path to another node that is taken when a user utterance is not relevant to the node, receiving a graph of a chatbot, at the computer system, and analyzing, at the computer system, the received graph of the chatbot to classify characteristics of operation of the chatbot.

In embodiments, the content-based representation may be generated by building a vocabulary comprising a plurality of terms from a plurality of conversations of a plurality of chatbots, building a vector template comprising a plurality of most popular terms from the vocabulary, computing a frequency of each term in the plurality of conversations, and generating two vectors, a first vector comprising user utterances and a second vector comprising chatbot responses. Each vector may be generated by computing, for each conversation, a frequency of a term in the conversation, weighting the frequency of the term in the conversation with the frequency of the term in the plurality of conversations, and storing the weighted frequency in the vector at a location indicated by an index of the term. The structure-based representation may be generated by building a bin vector comprising a plurality of bins and a plurality of sections, wherein each section comprises at least one bin, mapping each level in the graph of the chatbot to a section in the bin vector, and mapping each node in the chatbot graph to a bin in associated section, and modeling each conversation in the bin vector. Each conversation in the bin vector may be modeled by modeling each user utterance in a bin vector; and aggregating the user utterance bin vectors to form a conversation modeling bin vector. Analyzing the received graph of the chatbot to classify characteristics of operation of the chatbot comprises determining whether the chatbot is in production use with real users. Analyzing the received graph of the chatbot to classify characteristics of operation of the chatbot comprises determining whether conversations of the chatbot are egregious conversations in which the chatbot behaved so badly that a human agent is needed to salvage the conversations.

In an embodiment, a system may comprise a processor, memory accessible by the processor, and computer program instructions stored in the memory and executable by the processor to perform training a neural network model to learn representations that capture characteristics of the graphs of chatbots, wherein the captured characteristics include at least a content-based representation based on user utterances that are relevant to the nodes and based on the chatbot response for the nodes, wherein each graph of a chatbot comprises a plurality of nodes, wherein each node comprises information indicating user utterances that are relevant to the node, wherein at least some of the nodes comprise information indicating a chatbot response for the node, and wherein at least some of the nodes have a positive path to another node that is taken when a user utterance is relevant to the node, and at least some of the nodes have a negative path to another node that is taken when a user utterance is not relevant to the node, receiving a graph of a chatbot, at the computer system, and analyzing, at the computer system, the received graph of the chatbot to classify characteristics of operation of the chatbot.

In an embodiment, a computer program product may comprise a non-transitory computer readable storage having program instructions embodied therewith, the program instructions executable by a computer system comprising a processor, memory accessible by the processor, and computer program instructions stored in the memory and executable by the processor, to cause a computer system perform a method comprising training, at the computer system, a neural network model to learn representations that capture characteristics of the graphs of chatbots, wherein the captured characteristics include at least a content-based representation based on user utterances that are relevant to the nodes and based on the chatbot response for the nodes, wherein each graph of a chatbot comprises a plurality of nodes, wherein each node comprises information indicating user utterances that are relevant to the node, wherein at least some of the nodes comprise information indicating a chatbot response for the node, and wherein at least some of the nodes have a positive path to another node that is taken when a user utterance is relevant to the node, and at least some of the nodes have a negative path to another node that is taken when a user utterance is not relevant to the node, receiving a graph of a chatbot, at the computer system, and analyzing, at the computer system, the received graph of the chatbot to classify characteristics of operation of the chatbot.

BRIEF DESCRIPTION OF THE DRAWINGS

The details of the present invention, both as to its structure and operation, can best be understood by referring to the accompanying drawings, in which like reference numbers and designations refer to like elements.

FIG. 3 is an exemplary diagram of a portion of a conversation between a human and a bot according to embodiments of the present systems and methods.

FIG. 5 illustrates an example of bin vector according to embodiments of the present systems and methods.

FIG. 6 illustrates an example of bin vectors resulting from operation of a path sorting process according to embodiments of the present systems and methods.

DETAILED DESCRIPTION

Figure 1:
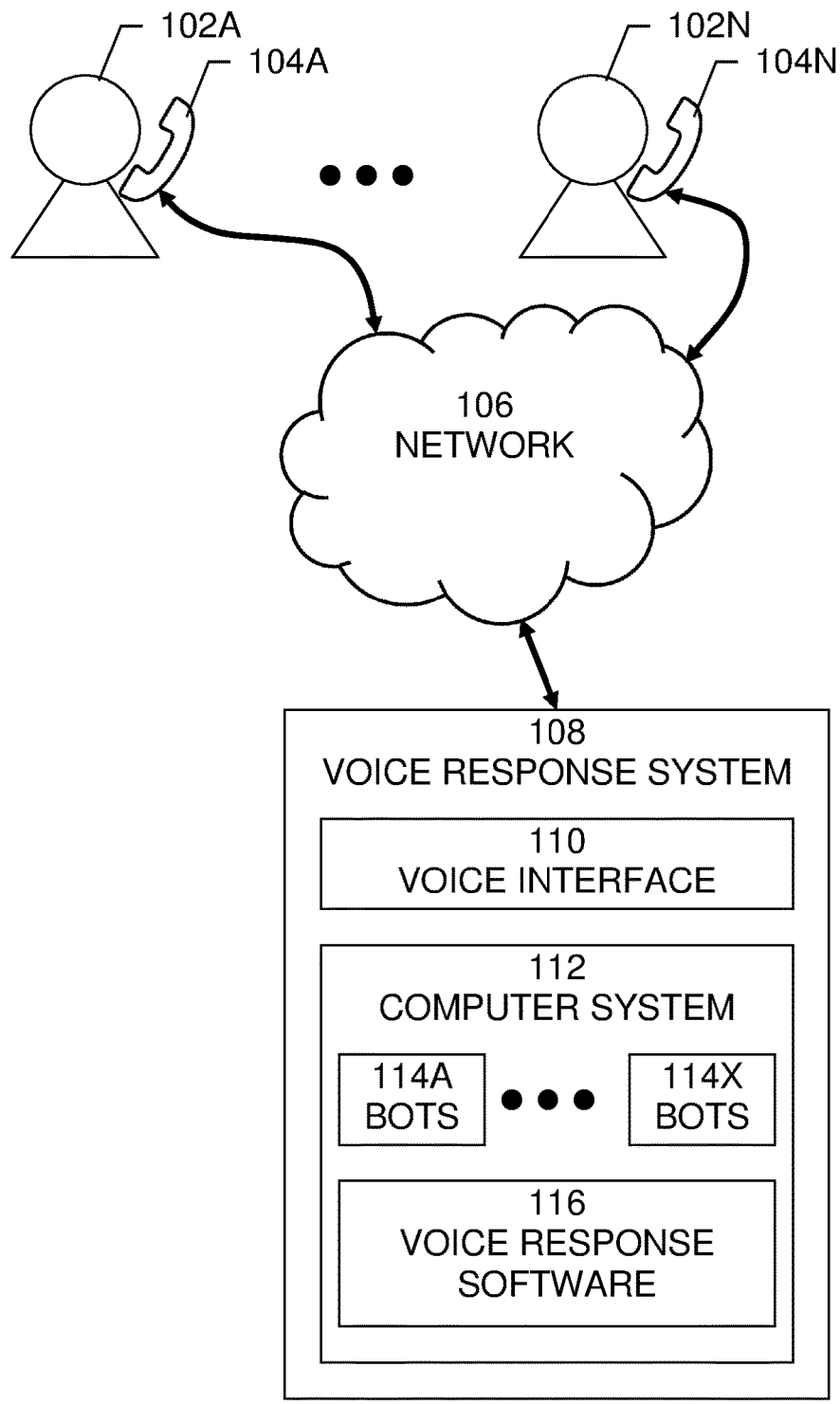
FIG. 1 illustrates an exemplary system in which embodiments of the present systems and methods may be implemented.

Embodiments of the present systems and methods may provide techniques by which bots may be implemented using improved representations of bot structure and a means of assessing conversational quality that may provide improved efficiency. For example, embodiments of the present systems and methods may utilize new models that captures a compact representation of a bot (such as bot embeddings) based on the graph structure and usage logs of the bot. This representation may be used to improve the quality of bot analysis tasks, such as the detection of whether a bot is "real" that is, is actually being used to handle customer requests, as opposed, say, to merely being used to test the capabilities of the platform, and the detection of problematic conversations between a bot and a human user (which may be useful for focusing improvement efforts on a deployed bot).

As conversational systems such as chatbots or bots, become more pervasive, careful analysis of their capabilities becomes more important. Conversational systems are being used for a variety of support, service, and sales applications that were formerly handled by human agents, and the organizations deploying such systems must be able to understand their behavior and improve their performance. In many cases, such an analysis can be viewed as a classification task whose goal is to check whether a bot or a particular instance of a conversation satisfies some property, such as, is the conversation successful? Thus, the problem of representation of the bot itself, together with the conversations associated with it, may be posed as follows: given a classification task applied to conversations between a human and a bot, what representations can be used as input that will maximize the classification quality? For example, to automatically detect and classify problematic conversations, how should the conversations be formally represented in order to increase classification accuracy?

For a conversation itself, there exists a natural way to represent it as a text, which is the concatenation of the human and bot utterances (although in many cases, deriving this simple representation from available logs is not straightforward). As for a bot, the question of representation is more complicated: bots are complex objects that execute some logic in order to drive conversations with users. How should they best be represented?

Embodiments of the present systems and methods may provide techniques may utilize a new model that learns bot embeddings with both content and graph based representations. The graph representation may be based on dynamic conversation paths. Embodiments of the present systems and methods may provide techniques may be characterized using a number of classification tasks. For example, at the level of entire bots, a classification task may detect whether the bot is real, that is, in production use with real human users, or not. As another example, at the conversation level within each bot, a classification task may detect problematic conversations with a deployed bot in support of focusing improvement efforts.

System Overview. An exemplary system 100 in which embodiments of the present systems and methods may be implemented is shown in FIG. 1. As shown in FIG. 1, a plurality of users 102A-N may utilize communications devices 104A-N to communicate through network 106 with Voice Response System (VRS) 108. Typically users 102A-N may be humans utilizing communications devices 104A-N to communicate, but in some embodiments, users 102A-N may be automated systems themselves. Communications devices 104A-N may be any type of communications devices capable of transmitting and receiving voice signals, such as landline telephones, mobile telephones, Voice-over-Internet-Protocol (VoIP) telephones, computer with voice or VoIP capability, etc. In the case in which users 102A-N may be automated systems, communications devices 104A-N may be telephones or communications devices 104A-N may be communications interface circuitry included in or connected to the automated systems. Network 106 may be any communications network capable of communicating voice signals, such as the Public Switched Telephone Network (PSTN), mobile or wireless communications networks, analog or digital networks, public, private, or proprietary networks, local area networks (LANs), wide area networks (WANs), the Internet, etc.

VRS 108 may be any standard, proprietary, or custom voice response system capable of communicating voice signals with network 106, interpreting received voice signals, transmitting voice prompts, answers, or information, and performing conversations with users. VRS 108 may include voice interface 110 and computer system 112. Voice interface 112 may be communications interface circuitry to interface VRS 108 with network 106 and to provide communications of voice signals between VRS 108 and network 106/communications devices 104A-N. Computer system may be any may be any standard, proprietary, or custom computer system adapted to control VRS 108. Computer system 112 may include bots 114A-X and voice response software 116. Bots 114A-X may be chatbots as described herein, while voice response software 116 may be software routines to operate bots 114A-X and to provide the functional logic therefor.

Figure 2:
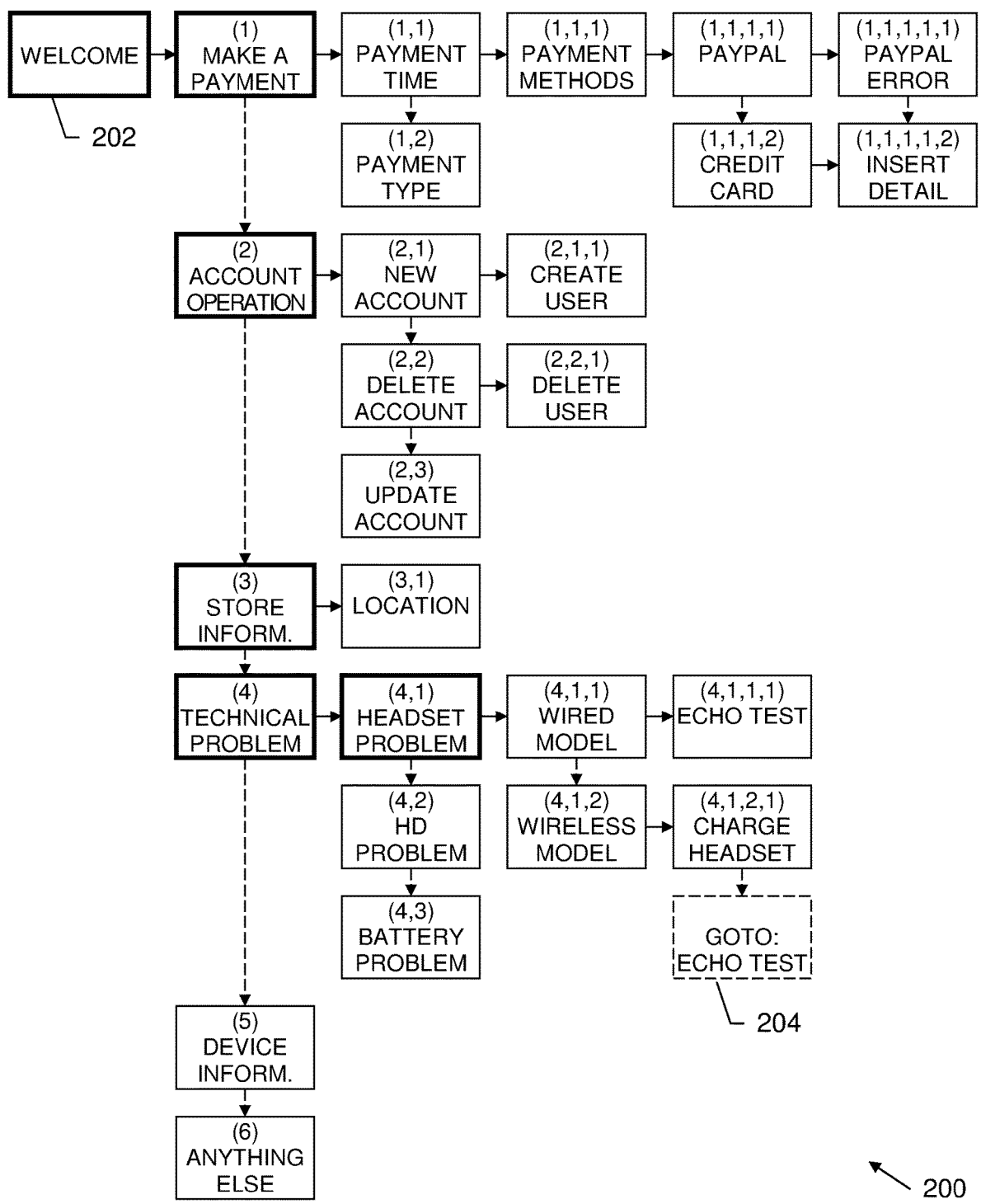
FIG. 2 is an exemplary diagram of a portion of a customer support bot graph according to embodiments of the present systems and methods.

Bot Overview. An example of a part of a customer support bot graph 200 is shown in FIG. 2, and may be used to explain how such a graph is used in the context of a conversation. In this example, jump nodes are shown as dashed boxes, negative edges are shown as dashed arrows, and positive edges are shown as solid arrows.

At every step or turn of a conversation with a bot, a human user expresses an utterance, such as "I'm having some issues with my headset", and the bot analyzes this utterance and determines how to respond and how to update its internal state. This determination is executed by traversing the graph, starting from a special node called the root node 202, and moving along the nodes of the graph according to a given set of rules as described below. Note that this description aims to present and explain key abstractions rather than the implementation details of an actual bot platform.

Graph Components. Every node in the graph has two internal parts: a user intent which is classified by a designated classifier, and an optional reply of the bot. Given a user utterance, the intent classifier is used to determine whether the user utterance matches the intent associated with the node. For example, the Technical problem node (4) may be defined to capture cases where users encounter a technical problem with a product, and this is what is being expressed in the utterance at hand, for example, "I'm having some issues with my headset". In this case, the classifier should be able to classify this utterance as relevant to this intent. In practice, the classifier may be trained by bot programmers providing a set of examples of utterances and their associated intents.

Every node is the source of two optional edges: a positive edge and a negative edge. If a user utterance has been classified positively, an optional node answer may be presented to the user, and the execution moves to the node which is the target of the positive edge. When the execution moves along a positive edge, it is possible to obtain additional input from the user, and continue the evaluation using this input. If a user utterance has been classified negatively, the execution moves to the node which is the target of the negative edge. As shown in FIG. 1, nodes may be represented as connected by negative edges along the vertical axis, and nodes may be represented as connected by positive edges along the horizontal axis. In addition, positive edges are marked with a solid line, and negative edges are marked with a dashed line.

When there is no positive edge and the classification is positive, the execution stops, and the system waits for the next user utterance. When there is no negative edge and the classification is negative, execution jumps back to the root node 202 to resume evaluation from the start.

In addition to the nodes described, there are special sink nodes, for example, the Anything Else node (6), which are not the source of any edges. Special sink nodes may output a special default message such as "I'm still in a learning phase, is there anything else I can help you with?" As bots support only a limited set of intents, this mechanism may be used to let the user know that some intent is beyond the knowledge of the bot, and to initiate a recovery process.

Graph Execution. A conversation starts by traversing the graph from the root node 202. The root node is special in that it does not expect a user utterance, and it only has a positive edge. Its optional response, which can be a greeting message for example, may only be output once at the beginning of the conversation.

Consequently, given a user utterance, analysis of the utterance defines a path in the graph, and each instance of a conversation between a human and the bot may be represented as an ordered set of paths in the graph. An example of such a conversation is shown in FIG. 3. The first user utterance shown in FIG. 3 ("I'm having some issues with my headset") is evaluated by a plurality of nodes (1), (2), (3), (4), marked in bold in FIG. 2. Thus, the path that is created by the analysis of this utterance starts with the root node 202, then moves to the Make a payment node (1), checking whether this utterance expresses the user intention to make a payment. Since the utterance does not express the user intention to make a payment, control moves to the Account operation node (2), and then, in turn, to the Store information node (3), along the negative edges, until it reaches the Technical problem node (4). Here, the internal classifier determines that the utterance indeed expresses that the user encountered a technical problem. As a result, the control moves along the positive edge to the Headset problem node (4,1). Once the node's reply is presented to the user ("Which model are you using?"), the system then waits for the next user utterance. The next user utterance ("A wireless one.") leads to the Wireless model node (4,1,2), hence the resulting path for this utterance is a continuation of the previous path.

Note that nodes connected vertically by negative edges represent alternative understandings of an utterance. That is, in this example, an utterance may be identified as Account operation, Store information or Technical problem, etc. Nodes connected by horizontal positive edges represent specializations of the analysis. That is, after the utterance is classified as Technical problem, moving along the positive edge will check whether the utterance expresses a Headset problem, or (moving again vertically along negative edges) a HD problem or, alternatively, a Battery problem.

In addition, special jump nodes are nodes that allow the conversation to jump to a designated node. In this example, the node 204 below Charge headset, which refers to the Echo test node, is a jump. Such jump nodes are not essential, but simplify the graph by preventing duplication of subgraphs.

Notations. In embodiments, a grid representation may define the depth of the graph as the maximum number of nodes from left to right (ignoring the root node), which are nodes connected by positive edges. The depth of a node v may be defined as the number of positive edges used to traverse the graph from the root node to v. In the example shown in FIG. 2, the depth of the graph is 5, while the depth of the Headset problem starting at node (4,1) is 2. The level l may be defined as the set of all the nodes whose depth is l. The width of the graph at level l may be defined as the maximum number of nodes connected by negative edges at this level. In this example, the width of level 1 is 6, while the width of level 2 is 3.

To further simplify notations, consider that the grid layout defines coordinates for the nodes from left to right and from top to bottom. For example, node Technical problem is mapped to (4), which means that it is the 4th node from top to bottom at level 1. The node Headset problem is mapped to (4,1), meaning that it is the 1st node at level 2 of the 4th node at level 1. Similarly, the node HD problem is mapped to coordinate (4,2) and Wireless model is (4,1,2). Note that nodes that are found deeper in the graph are mapped to a longer list of coordinates. The maximum possible length of a coordinate for a node is the depth of the graph.

Bot Behavior. The graph of a bot determines its behavior, and thus, the structure of the graph captures interesting properties of the bot. For example, there are bots designed to handle simple Q&A conversations, as opposed to bots that handle filling in the details of complex transactions. For Q&A bots, the graph is likely to be of depth 1, with many nodes at this level, representing various alternative questions and answers. For bots handling complex conversations, the graphs are likely to be deeper in order to handle more complicated cases. In general, bots handling narrow use-cases, and which are very specific in their dialog capabilities, are likely to have fewer nodes and more jumps to sink nodes. Thus, in order to capture the bot behavior, the different characteristics of the bot graph should be considered. Embodiments of the present systems and methods may utilize representations that capture such characteristics.

Figure 4:
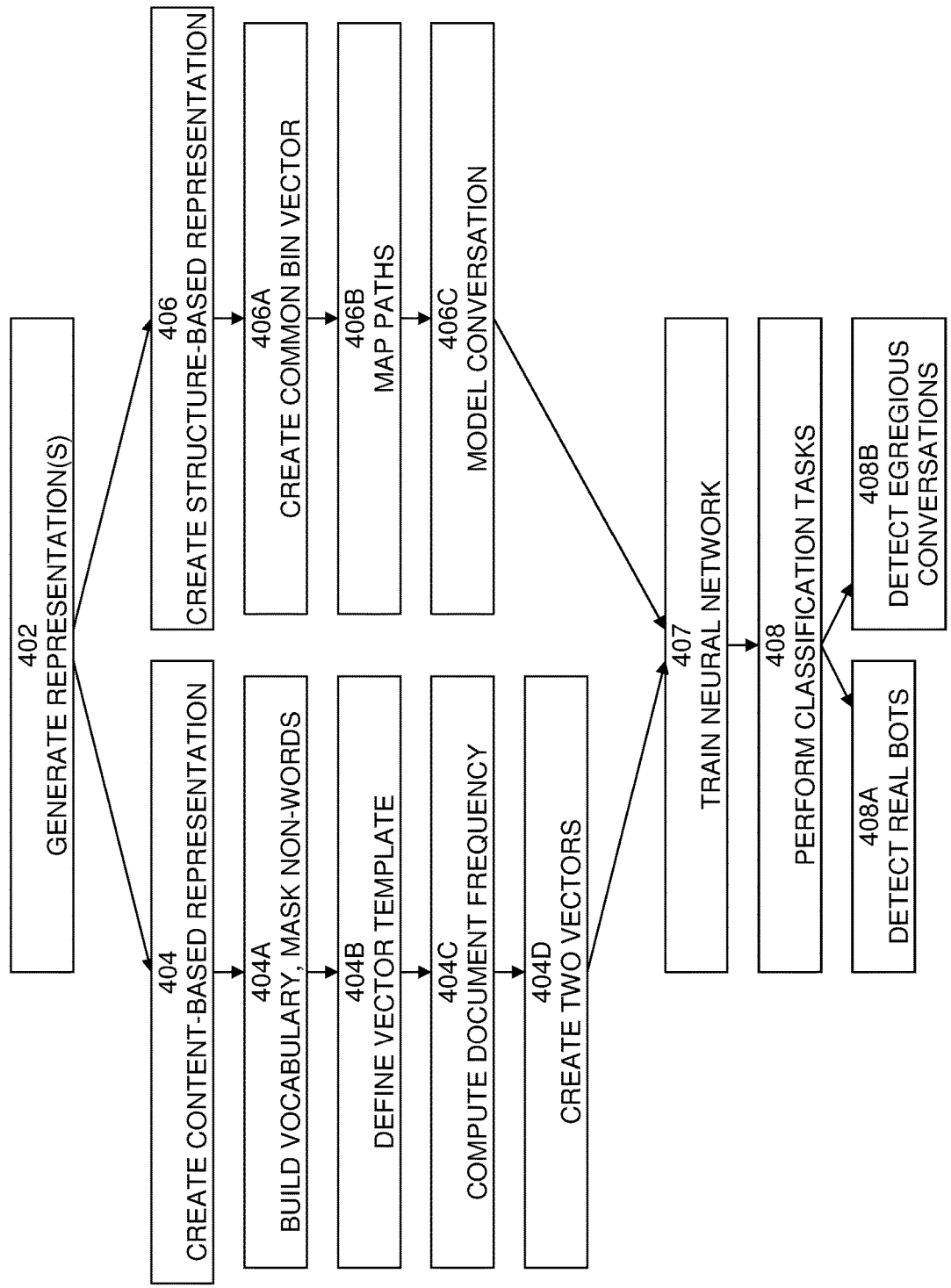
FIG. 4 is an exemplary flow diagram of a process of operation of embodiments of the present systems and methods.

An exemplary flow diagram of a process 400 of operation of embodiments of the present systems and methods is shown in FIG. 4. Process 400 begins with 402, in which representations that capture different characteristics of the bot graph may be generated. For example, either a content-based representation or a structure-based representation of conversations between a human and a bot, or both, may be generated. Both are described below. The representations may be in the form of a vector representing the bot.

A conversation may be represented using its textual content and using its bot graph structure which is used as input for the model, as described below.

Content-based Representation. Conversations between users and bots occur in natural language, and as shown in FIG. 3, may be composed of user utterances and bot responses. At 404 of FIG. 4, a textual content-based representation of a conversation may be created. The first step for creating a textual representation of the conversation is to build a vocabulary 404A, which is the union of all terms across all conversations of all the bots in the dataset. While doing so, tokens that are not words, such as URLs, HTML tags, bot names, etc., may be masked. At 404B, in order to exclude infrequent tokens (which are probably bot specific), a vector template of length k may be defined including the k most popular terms from the vocabulary, where each term from the vocabulary has a fixed index. Each conversation may be considered a separate document, and at 404C, for each term its document frequency df may be computed.

At 404D, for a given conversation, two vectors may be created according to the template defined at 404B, one vector for the user utterances and one vector for the bot responses. To do so, the concatenation of the user utterances and the concatenation of the bot answers may be considered as two separate documents. For each term t in each document, its frequency in the document tf may be calculated, tf may be weighted based on the term's document frequency df, and the resulting value may be saved in the corresponding vector at the index of t. The two vectors may be used as the textual representation of the conversation.

Structure-based Representation. Structure-based representation may characterize bot behavior by analyzing its conversations with respect to the structure of the bot graph. The characterization should result in a vectorized representation that summarizes the conversation. As described above, each conversation may be represented as an ordered list of its turns' paths in the graph.

At 406, a structure-based representation may be created. A structure-based representation may capture the characteristics of how bots are being utilized. For example, a structure-based representation, may capture which nodes are being visited during a conversation with a user, at which nodes the conversation's turns end, etc. To be able to compare bots with different structure, a common bin vector may be defined to represent a conversation, and the various bot graphs may be mapped to the common bin vector.

At 406A, a bin vector may be created such that the nodes of the original bot graph are mapped to the bins based on their coordinates in the graph. Each bin vector may be divided into a number of sections, and each section may be divided into bins. Since the idea is to represent a conversation path in a standardized and compact way across different bots, each level in the bot graph may be mapped to a section in the bin vector, and every node in the bot graph may be mapped to a bin in the appropriate section. Several levels may be mapped to the same section, and several nodes may be mapped to the same bin (the sections do not necessarily have the same number of bins). The number of sections and bins in the bin vector may be set based on the depths and widths of all the bots graphs, for example, the average depth of the graphs and the average width of each level in the graphs.

An example of a bin vector 500 is shown in FIG. 5. Bin vector 500 in this example has three section, with three bins in section 1, two bins in section 2, and one bin in section 3. The mapping may be done as shown in Algorithm 1 502: assume that the depth of the bot graph is d, and that the width of every level in the graph is $w_1, w_2, \ldots, w_d$. As shown in the example in FIG. 2, the depth is 5, and the widths of the levels are 6, 3, 2, 2 and 2, respectively. The mapping of this graph to a bin vector 500 with three sections is shown, such that the number of bins per section are 3, 2, and 1 respectively. Algorithm 1 502 describes the mapping of the graph nodes to the bin vector. In this example, nodes (1), (1, 1), (2), (2, 1), (3, 1), and (4, 1) may be mapped to bin 1 in section 1. Similarly, nodes (1, 2), (2, 2), (3), (4), and (4, 2) may be mapped to bin 2 in section 1. The complete mapping of all the nodes is shown in the example of FIG. 5.

Utterance modeling. Each utterance may be represented in the bin vector, as explained below. Each user utterance in a conversation may be represented by a path in the bot graph, whose nodes are mapped to sections and bins in the bin vector. Thus, in order to capture how every utterance is being analyzed, embodiments may distinguish between different types of nodes in the path. For example, 1) a success (s) node may be the last node of the path if it is not a sink node. 2) A failure (f) node may be the last node of the path if it is a sink node. 3) All the other nodes that belong to the path are regular (r) nodes. 4) Nodes that do not belong to the path may be uninvolved (u) nodes.

A path may be used to identify the type of the nodes after they are mapped, at 406B, to the corresponding bins in the bin vector using the described path sorting process. Thus, each bin in the bin vector may maintain, for example, four counters, one counter for each type of node that can be mapped to it from the paths (in this example, success, failure, regular and uninvolved). For example, the mapping of the first user utterance "I'm having some issues with my headset" to the bin vector shown in FIG. 5 is as follows (with the resulting bin vectors shown in FIG. 6):

The first node in the bot graph in FIG. 2 that is visited is "Make a payment" (1). This node may be mapped to the first bin in section 1 of bin vector 500. Thus the regular counter is set to 1 for this bin.

The second node traversed in the bot graph is "Account operation" (2), which is mapped to the same first bin of section 1 of the bin vector. Hence, the regular counter of this bin is set to 2 in bin vector 500.

Similarly, nodes "Store information" (3) and "Technical problem" (4) are visited, and that sets the regular counter of bin 2 in section 1 to 2.

Finally, the "Headset problem" (4, 1) node is visited, and that sets the success counter of bin 1 in section 1 to 1, as this is the last node that is being visited for this utterance. The uninvolved counters of the bins may be updated according to the nodes that were not visited during the traversal. So, when this path is mapped to the bin vector, the counters as shown, for example, in "Turn 1" 602 in FIG. 6 may be obtained.

Conversation modeling. As the input to the model is a conversation, the conversation may be modeled, at 406C in FIG. 4, by aggregating the bin vectors of the user utterances paths by summing each counter based on the node types (s, f, r, or u) across all the bins in the matching sections. This aggregation captures different patterns of the conversation, such as how many times nodes which are mapped to a bin are visited, how many turns ended successfully in the mapped nodes vs how many turns failed in these nodes, etc. FIG. 6 shows examples of the detailed vectors for the first user utterance 602 and the fifth user utterance from FIG. 2, as well as the aggregated vector 606 obtained for the whole conversation.

At 407, a neural network model may be trained to learn the generated representations. The training input to this model may be either the content-based representation or the structure-based representation of conversations between a human and a bot, or both The representations may be in the form of a vector representing the bot.

To learn the representation, a fully connected network with N hidden layers may be used. During training, the input to this network may be the representation of a conversation (either content-based or structure-based), and the ground truth may be a one-hot vector (only one true or high value, all other values false or low) of the bot that handled this conversation. In other words, given a conversation c, the network may predict which bot handled c using, for example, SoftMax, which is a distribution over the bots. Thus, the output layer vector of the model may have the size of the number of bots in the dataset. Once the model is trained, the representation of a bot b may be the weights vector $V_b$, where V is the output embedding matrix (the weights matrix connecting the last hidden layer to the output layer).

This training procedure (using cross-entropy loss) should drive similar bots to similar representations, given that they handle similar conversations. The content-based model may be denoted as bot2vec-C, and the structure-based model as bot2vec-S.

Classification Tasks. At 408, embodiments may utilize the bot embeddings for a variety of bot classification analytics tasks. For example, at 408A, real bots may be detected. Detecting Real Bots. Typically, a percentage of bots are not being used with real customers. To understand how a platform's bots perform with actual users, it is important to first determine which bots have moved beyond debugging and testing into production. This is made difficult by the fact that bot testing often involves somewhat realistic simulations of conversations. As another example, at 408B, egregious conversations may be detected. Detecting Egregious Conversations. Once in production, bot log analysis may form the basis for continuous improvement. Finding the areas most in need of improvement may be complicated by the fact that bots may have thousands of conversations per day making it hard to find conversations failing from causes such as faulty classification of user intent, bugs in dialog descriptions, and inadequate use of conversational context. Detection of egregious conversations involve finding those conversations in which the chatbot behaves so badly that a human agent, if available, would be needed to salvage the conversations. Finding these egregious conversations can help identify where improvement efforts should be focused.

Figure 7:
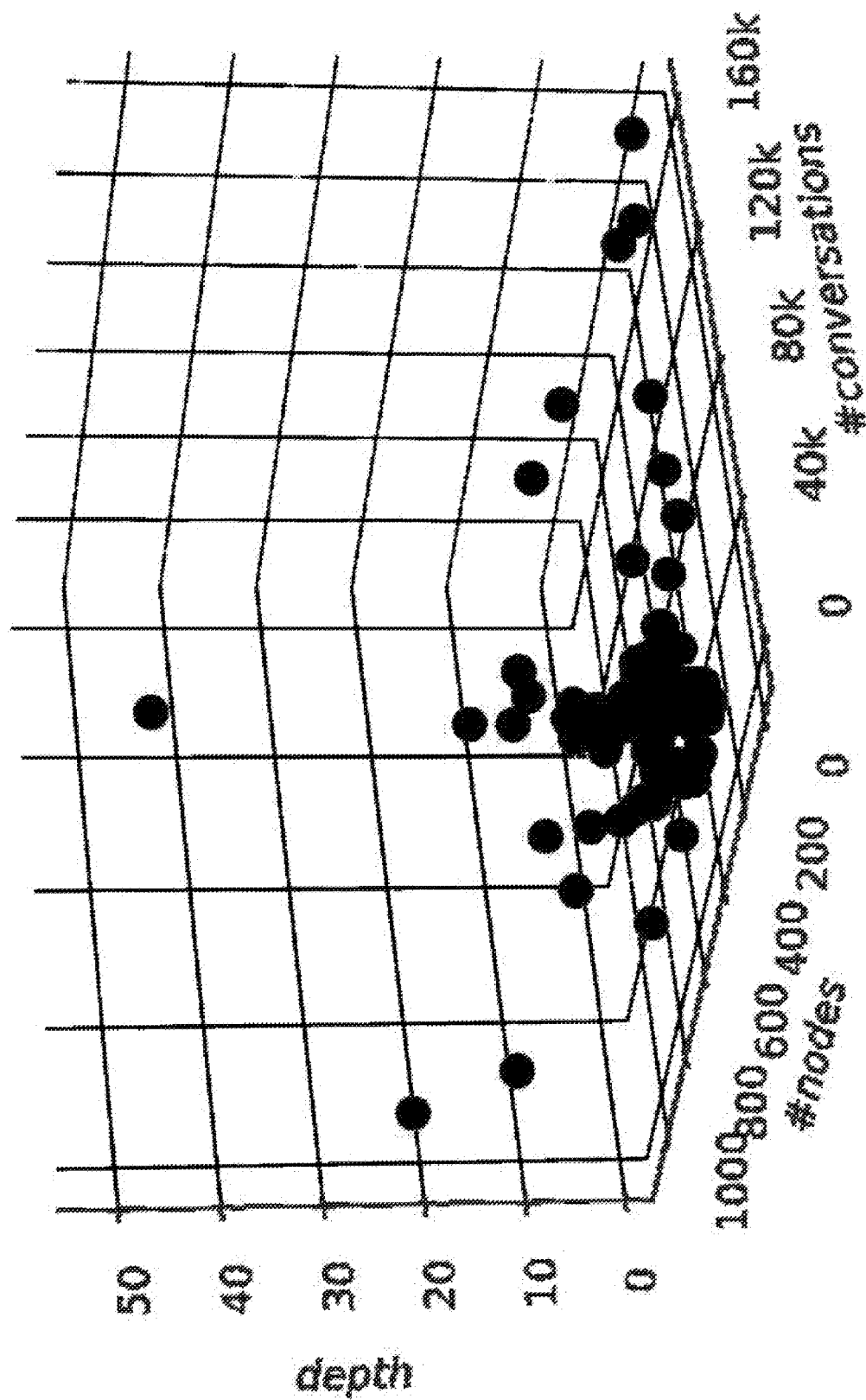
FIG. 7 illustrates an exemplary summary of information utilized in experimental operation of embodiments of the present systems and methods.

Experiments. Data. Experiments were performed and represent examples of actual uses of the present systems and methods. The experiments involved collecting two months of data from 92 bots, including their graphs and conversations logs. The bots' domains included health, finance, banking, travel, HR, IT support, and more. FIG. 7 summarizes the information about number of conversations, number of nodes and graph depth for the bots. In total, 1.3 million conversations were collected, with a minimum of 110 conversations and a maximum of 161,000 conversations per bot. For 62% of the bots, the number of conversations varied from 1000 to 10000. Bot structure varied as reflected in their underlying graphs: graph depth ranged from 2 to 52 levels with an average depth of 7; the total number of nodes ranged from 11 to 1088 with an average of 160 nodes per bot.

Experimental Setting. Common bin vector. As described above, to capture comparable behavior across bots, one common bin vector was created using the average depth and average width for each level of the bots graphs. Specifically, first, based on the average depth, the number of sections was defined to be 7. Then the number of bins was set for each section, based on the average width per level per bot, to 108, 10, 6, 17, 8, 4, and 1, respectively.

bot2vec implementation details. Content-based: The content-based model input comprised two vectors of size 5000 each (representing the top k=5000 most common words in the corpus vocabulary, that is, in all the conversations of all the bots), one vector representing the user utterances and the second vector representing the bot answers. The two vectors were concatenated and passed through a fully connected layer of a neural network model with 5000 units. The squared difference of the two vectors and an element-wise multiplication of the vectors was calculated to capture the interaction between the user and the bot. The three vectors were then concatenated and passed through another fully connected layer of the neural network model with 1000 units, followed by another fully connected layer of the neural network model with 100 units.

Structure-based: The structure-based model input was a single vector with the size of 616 (the total number of bins (154) times the 4 counters per bin). The input vector was passed through a fully connected layer of a neural network model with 100 units, followed by another fully connected layer of the neural network model with 20 units.

For both models, the last hidden layer was connected to the output layer (sized based on the number of modeled bots). All hidden layers consisted of rectified linear unit (ReLU) activation units, and may be regularized using dropout rate of 0.5. The model was optimized using the Adam optimizer, using a learning rate=0:001, beta1=0:9, beta2=0:999.

Task 1 Detecting Real Bots. This task attempted to determine whether the bot is real, in the sense that it is in production and not merely being tested or debugged.

Ground truth. The first step in building a classification model may be to obtain ground truth data. For this purpose, for each bot, 100 conversations from the datasets were randomly sampled. The sampled conversations were tagged by two different expert judges. Given a full conversation, each judge tagged whether the conversation was real or test/debugging. If more than 50% of the conversations were tagged as real, then the bot was tagged as real. In addition, if the bot was tagged as not real, the experts had to provide a list of reasons for why they believed it was not real, for example, repeating users IDs, same bot response, etc. True binary labels were generated by considering a bot to be real if both judges agreed (The inter rater reliability between judges, measured by Cohen's Kappa, was 0:95 which indicates a high level of agreement.) This process generated the real bot class size of 40 (44% of the 92 bots).

Baseline model. The baseline model was denoted bot-STAT and was implemented as follows: for each bot statistical features were calculated, such as the number of unique customer sentences, number of conversations, number of unique agent responses, and statistical measures (mean, median, percentile) of the following metrics: number of turns of a conversation, number of tokens in each turn in a conversation, and the time of a turn in a conversation. In total 17, features were implemented.

In the implementation, an SVM classifier was used (as there were only 92 samples), the F1-score of the real bot class was measured, and the models were evaluated using 10-fold cross-validation.

Results. Table 1 depicts the classification results for the three models that were explored. The bot2vec-S model outperformed the other models with an improvement of 18.6% over the baseline. In addition, it is noted that performance of the bot2vec-C is slightly better than the baseline, which indicates that the information that was captured by the content of the conversations was helpful to detect the usage of the bot. The structure-based representation, however, seems to capture the variability of the bots more effectively, such as the coverage of the conversations with respect to nodes that were visited, different conversations patterns, etc.

TABLE 1

| Model | F1-score | % improvement |
|---|---|---|
| bot-STAT | 0.519 | — |
| bot2vec-C | 0.545 | 5.0 |
| bot2vec-S | 0.616 | 18.6 |

Task 2—Detecting Egregious Conversations. This task involves analyzing the conversations themselves, aimed at detecting whether a specific conversation is egregious or not, as explained above.

Ground truth. In order to create ground truth data, 12 bots from the real bots were randomly sampled, and for each bot 100 conversations were labeled by, given the full conversation, each judge tagged whether the conversation was egregious or not. (5The inter rater reliability between judges, measured by Cohen' s Kappa, was 0:93 which indicates a high level of agreement.) The size of the egregious class varied between the bots, ranging from 8% to 48% of the conversations. All the conversations were aggregated to one dataset Baseline model, which was implemented based on an EGR model. In addition, all the models discussed below are an extension of the EGR model, such that for each conversation, its bot representation vector was concatenated to the EGR model's original feature vector. The F1-score of the egregious class was measured, and the models were evaluated using 10-fold cross-validation.

Results & Discussion. Table 2 summarizes the classification results for the four models. Specifically, the bot2vec-S outperforms all other models with an improvement of more than 16%. This shows that the structure-based representation of the bot encapsulates information which helps the model to distinguish between egregious and non-egregious conversations. Moreover, since the egregious conversation detection task is text oriented in its basis (meaning it is based on the textual properties of the conversations), the content-based representation of the bot also helped to improve the performance of the task.

TABLE 2

| Model | F1-score | % improvement |
|---|---|---|
| EGR | 0.537 | — |
| bot-STAT | 0.597 | 11.0 |
| bot2vec-C | 0.617 | 14.8 |
| bot2vec-S | 0.626 | 16.4 |

Structure-based Analysis. In practice, bots belong to various application domains like banking, IT and HR. Motivated by the similarity between word embeddings, the structure representation bot2vec-S was analyzed with respect to bots that belong to the same domain. For the real bots, domains like IT, HR, and banking were prominent with 10, 7, and 6 bots respectively, while the other bots belonged to a long tail of domains like travel, medical, etc. Thus, for the prominent domains (those domains that had more than 5 bots), the average distance was calculated using cosine similarity between vector representations for pairs of bots that belong to the domain vs pairs of bots from different domains. Specifically, for IT, HR, and banking bots, the average distance between bots within their domain is 0.614, while the distance between bots from different domains is 0.694 (13% larger). Thus, the representations of bots that belong to the same domain present indeed a higher level of similarity.

Figure 8:
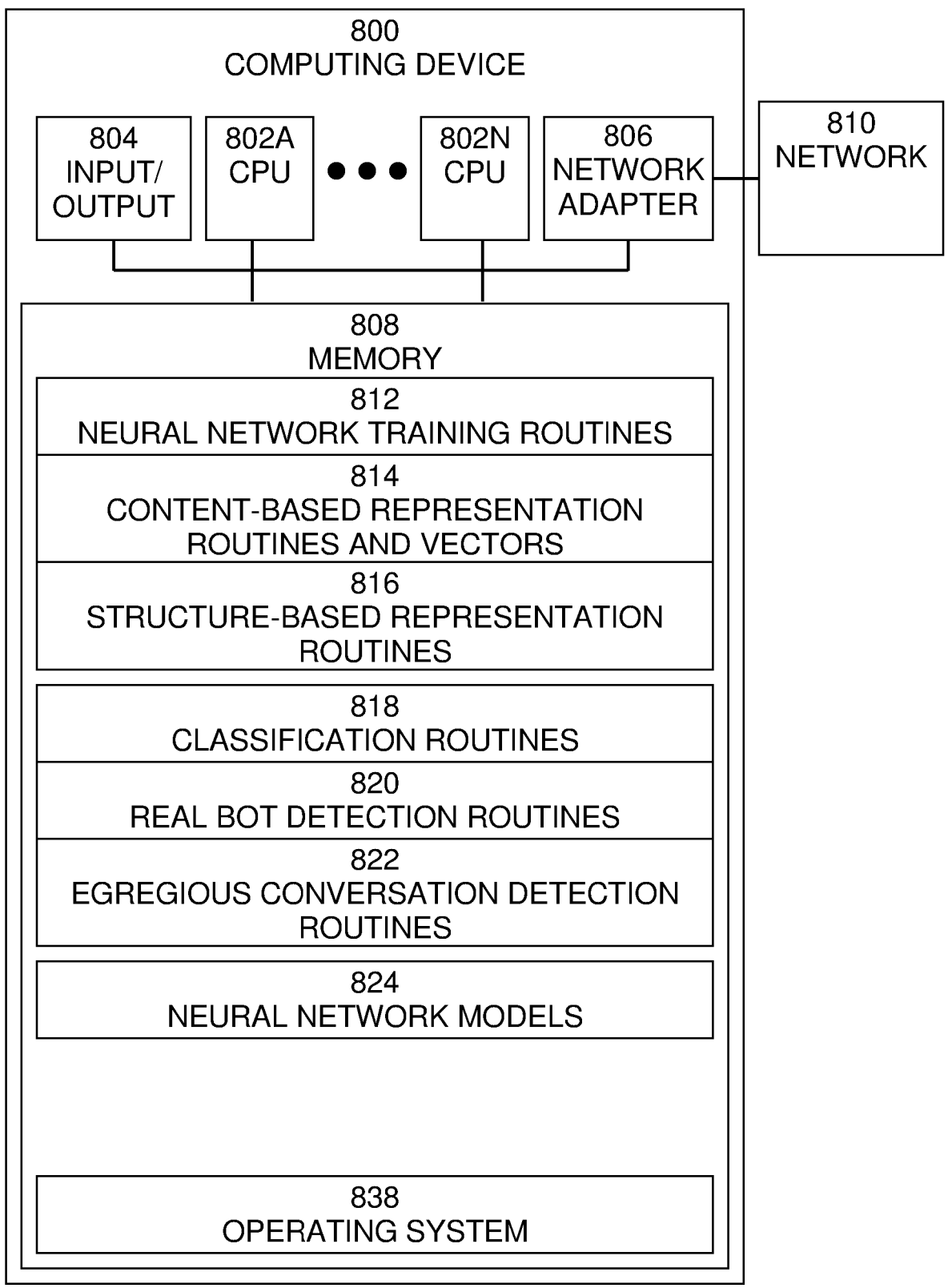
FIG. 8 is an exemplary block diagram of a computer system in which processes involved in the embodiments described herein may be implemented.

An exemplary block diagram of a computer system/computing device 802, in which processes involved in the embodiments described herein may be implemented, is shown in FIG. 8. Computer system/computing device 802 may be implemented using one or more programmed general-purpose computer systems, such as embedded processors, systems on a chip, personal computers, workstations, server systems, and minicomputers or mainframe computers, mobile devices, such as smartphones or tablets, or in distributed, networked computing environments. Computer system/computing device 802 may include one or more processors (CPUs) 802A-802N, input/output circuitry 804, network adapter 806, and memory 808. CPUs 802A-802N execute program instructions in order to carry out the functions of the present communications systems and methods. Typically, CPUs 802A-802N are one or more microprocessors, such as an INTEL CORE® processor or an ARM® processor. FIG. 8 illustrates an embodiment in which computer system/computing device 802 is implemented as a single multi-processor computer system/computing device, in which multiple processors 802A-802N share system resources, such as memory 808, input/output circuitry 804, and network adapter 806. However, the present communications systems and methods also include embodiments in which computer system/computing device 802 is implemented as a plurality of networked computer systems, which may be single-processor computer system/computing devices, multi-processor computer system/computing devices, or a mix thereof.

Input/output circuitry 804 provides the capability to input data to, or output data from, computer system/computing device 802. For example, input/output circuitry may include input devices, such as keyboards, mice, touchpads, trackballs, scanners, analog to digital converters, etc., output devices, such as video adapters, monitors, printers, biometric information acquisition devices, etc., and input/output devices, such as, modems, etc. Network adapter 806 interfaces device 800 with a network 810. Network 810 may be any public or proprietary LAN or WAN, including, but not limited to, the Internet.

Memory 808 stores program instructions that are executed by, and data that are used and processed by, CPU 802 to perform the functions of computer system/computing device 802. Memory 808 may include, for example, electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 808 may vary depending upon the function that computer system/computing device 802 is programmed to perform. In the example shown in FIG. 8, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 8, memory 808 may include software code and data for neural network training routines 812, content-based representation routines and vectors 814, structure-based representation routines and vectors 816, classification routines 818, real bot detection routines 820, egregious conversation detection routines 822, neural network models 824. Neural network training routines 812 may include software routines to train neural network models 824, as described above. Content-based representation routines and vectors 814 may include software routines and vector data to create a textual content-based representation of a conversation, as described above. Structure-based representation routines and vectors 816 may include software routines and vector data to create a structure-based representation of a conversation, as described above. Classification routines 818 may include software routines to perform bot classification analytics tasks, as described above. Real bot detection routines 820 may include software routines to perform detection of real bots, as described above. Egregious conversation detection routines 822 may include software routines to perform detection of egregious conversations, as described above. Neural network models 824 may include trained and/or untrained neural network models that have been trained, or may be trained by neural network training routines 812, as described above.

Database management system 816 may include data skipping indexes, data, and routines 822, and filters and routines 824. Data skipping indexes, data, and routines 822 may include software routines, data, and database indexes to implement support for data skipping indexes, which may include index information only for those data items that meet certain criteria. Filters and routines 824 may include software routines to implement filtering of data using data skipping. Operating system 824 may provide overall system functionality.

As shown in FIG. 8, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method comprising:
    training, at a computer system comprising a processor, memory accessible by the processor, and computer program instructions stored in the memory and executable by the processor, a neural network model to learn representations that capture characteristics of the graphs of chatbots, wherein the captured characteristics include at least a content-based representation based on user utterances that are relevant to the nodes and based on the chatbot response for the nodes, and a structure-based representation, wherein each graph of a chatbot comprises a plurality of nodes, wherein each node comprises information indicating user utterances that are relevant to the node, wherein at least some of the nodes comprise information indicating a chatbot response for the node, and wherein at least some of the nodes have a positive path to another node that is taken when a user utterance is relevant to the node, and at least some of the nodes have a negative path to another node that is taken when a user utterance is not relevant to the node, and wherein the structure-based representation is generated by building a bin vector comprising a plurality of bins and a plurality of sections, wherein each section comprises at least one bin, mapping each level in the graph of the chatbot to a section in the bin vector, and mapping each node in the chatbot graph to a bin in associated section, and modeling each conversation in the bin vector;

receiving a graph of a chatbot, at the computer system; and analyzing, at the computer system, the received graph of the chatbot to classify characteristics of operation of the chatbot.

2. The method of claim 1, wherein the content-based representation is generated by:

building a vocabulary comprising a plurality of terms from a plurality of conversations of a plurality of chatbots;

building a vector template comprising a plurality of most popular terms from the vocabulary;

computing a frequency of each term in the plurality of conversations; and generating two vectors, a first vector comprising user utterances and a second vector comprising chatbot responses.

3. The method of claim 2, wherein each vector is generated by:

computing, for each conversation, a frequency of a term in the conversation;

weighting the frequency of the term in the conversation with the frequency of the term in the plurality of conversations; and storing the weighted frequency in the vector at a location indicated by an index of the term.

4. The method of claim 1, wherein analyzing the received graph of the chatbot to classify characteristics of operation of the chatbot comprises determining whether conversations of the chatbot are egregious conversations for which a human agent is needed to salvage the conversations.

5. The method of claim 1, wherein each conversation in the bin vector is modeled by:

modeling each user utterance in a bin vector; and aggregating the user utterance bin vectors to form a conversation modeling bin vector.

6. The method of claim 1, wherein analyzing the received graph of the chatbot to classify characteristics of operation of the chatbot comprises determining whether the chatbot is in production use with real users.

7. A system comprising a processor, memory accessible by the processor, and computer program instructions stored in the memory and executable by the processor to perform:

training, at a computer system comprising a processor, memory accessible by the processor, and computer program instructions stored in the memory and executable by the processor, a neural network model to learn representations that capture characteristics of the graphs of chatbots, wherein the captured characteristics include at least a content-based representation based on user utterances that are relevant to the nodes and based on the chatbot response for the nodes, and a structure-based representation, wherein each graph of a chatbot comprises a plurality of nodes, wherein each node comprises information indicating user utterances that are relevant to the node, wherein at least some of the nodes comprise information indicating a chatbot response for the node, and wherein at least some of the nodes have a positive path to another node that is taken when a user utterance is relevant to the node, and at least some of the nodes have a negative path to another node that is taken when a user utterance is not relevant to the node, and wherein the structure-based representation is generated by building a bin vector comprising a plurality of bins and a plurality of sections, wherein each section comprises at least one bin, mapping each level in the graph of the chatbot to a section in the bin vector, and mapping each node in the chatbot graph to a bin in associated section, and modeling each conversation in the bin vector;

receiving a graph of a chatbot, at the computer system; and analyzing, at the computer system, the received graph of the chatbot to classify characteristics of operation of the chatbot.

8. The system of claim 7, wherein analyzing the received graph of the chatbot to classify characteristics of operation of the chatbot comprises determining whether conversations of the chatbot are egregious conversations for which a human agent is needed to salvage the conversations.

9. The system of claim 7, wherein the content-based representation is generated by:

building a vocabulary comprising a plurality of terms from a plurality of conversations of a plurality of chatbots;

building a vector template comprising a plurality of most popular terms from the vocabulary;

computing a frequency of each term in the plurality of conversations; and generating two vectors, a first vector comprising user utterances and a second vector comprising chatbot responses.

10. The system of claim 9, wherein each vector is generated by:

computing, for each conversation, a frequency of a term in the conversation;

weighting the frequency of the term in the conversation with the frequency of the term in the plurality of conversations; and storing the weighted frequency in the vector at a location indicated by an index of the term.

11. The system of claim 7, wherein analyzing the received graph of the chatbot to classify characteristics of operation of the chatbot comprises determining whether the chatbot is in production use with real users.

12. The system of claim 7, wherein each conversation in the bin vector is modeled by:

modeling each user utterance in a bin vector; and aggregating the user utterance bin vectors to form a conversation modeling bin vector.

13. A computer program product comprising a non-transitory computer readable storage having program instructions embodied therewith, the program instructions executable by a computer system comprising a processor, memory accessible by the processor, and computer program instructions stored in the memory and executable by the processor, to cause a computer system perform a method comprising:

training, at a computer system comprising a processor, memory accessible by the processor, and computer program instructions stored in the memory and executable by the processor, a neural network model to learn representations that capture characteristics of the graphs of chatbots, wherein the captured characteristics include at least a content-based representation based on user utterances that are relevant to the nodes and based on the chatbot response for the nodes, and a structure-based representation, wherein each graph of a chatbot comprises a plurality of nodes, wherein each node comprises information indicating user utterances that are relevant to the node, wherein at least some of the nodes comprise information indicating a chatbot response for the node, and wherein at least some of the nodes have a positive path to another node that is taken when a user utterance is relevant to the node, and at least some of the nodes have a negative path to another node that is taken when a user utterance is not relevant to the node, and wherein the structure-based representation is generated by building a bin vector comprising a plurality of bins and a plurality of sections, wherein each section comprises at least one bin, mapping each level in the graph of the chatbot to a section in the bin vector, and mapping each node in the chatbot graph to a bin in associated section, and modeling each conversation in the bin vector;

receiving a graph of a chatbot, at the computer system; and analyzing, at the computer system, the received graph of the chatbot to classify characteristics of operation of the chatbot.

14. The computer program product of claim 13, wherein analyzing the received graph of the chatbot to classify characteristics of operation of the chatbot comprises determining whether the chatbot is in production use with real users, and wherein analyzing the received graph of the chatbot to classify characteristics of operation of the chatbot comprises determining whether conversations of the chatbot are egregious conversations in which the chatbot behaved so badly that for which a human agent is needed to salvage the conversations.

15. The computer program product of claim 13, wherein each conversation in the bin vector is modeled by:
    modeling each user utterance in a bin vector; and
    aggregating the user utterance bin vectors to form a conversation modeling bin vector.

16. The computer program product of claim 13, wherein the content-based representation is generated by:
    building a vocabulary comprising a plurality of terms from a plurality of conversations of a plurality of chatbots;
    building a vector template comprising a plurality of most popular terms from the vocabulary;
    computing a frequency of each term in the plurality of conversations; and
    generating two vectors, a first vector comprising user utterances and a second vector comprising chatbot responses.

17. The computer program product of claim 16, wherein each vector is generated by:
    computing, for each conversation, a frequency of a term in the conversation;
    weighting the frequency of the term in the conversation with the frequency of the term in the plurality of conversations; and
    storing the weighted frequency in the vector at a location indicated by an index of the term.

\* \* \* \* \*